United States Patent
Kung

(10) Patent No.: US 9,564,770 B2
(45) Date of Patent: Feb. 7, 2017

(54) POWER MANAGEMENT CIRCUIT, AND CONTROL CIRCUIT AND CONTROL METHOD THEREOF

(71) Applicant: Nien-Hui Kung, HsinChu (TW)

(72) Inventor: Nien-Hui Kung, HsinChu (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 390 days.

(21) Appl. No.: 14/176,072

(22) Filed: Feb. 8, 2014

(65) Prior Publication Data

US 2015/0229153 A1 Aug. 13, 2015

(51) Int. Cl.
*H02J 7/04* (2006.01)
*H02J 3/14* (2006.01)
*H02J 1/04* (2006.01)
*H02J 7/00* (2006.01)

(52) U.S. Cl.
CPC ............ *H02J 7/0072* (2013.01); *H02J 7/0052* (2013.01)

(58) Field of Classification Search
CPC ....... Y02E 60/12; H02J 7/0022; H02J 7/0068; H02J 7/0073; H02J 7/22; H02J 7/041; H02J 7/0031; H02J 3/14; H02J 1/14; H02J 7/14; H01M 10/44; H01M 10/0525; H01M 10/441; Y02B 70/3225; H02M 2001/008; H02M 3/33561; H02M 2001/009; Y04S 20/222; G04C 21/28; G04C 23/26; G05B 9/02; G05F 1/34; G01R 11/56; H02H 3/033
USPC .............. 320/128, 137, 157, 162; 307/31–35
See application file for complete search history.

(56) References Cited

U.S. PATENT DOCUMENTS

| | | | |
|---|---|---|---|
| 8,384,356 B2 * | 2/2013 | Deng | H02J 7/35 320/101 |
| 2012/0038334 A1 * | 2/2012 | Peng | H02M 3/1588 323/282 |
| 2012/0217936 A1 * | 8/2012 | Kung | H02J 7/0077 320/163 |

* cited by examiner

*Primary Examiner* — Richard Isla Rodas
*Assistant Examiner* — Mohammed J Sharief
(74) *Attorney, Agent, or Firm* — Tung & Associates

(57) ABSTRACT

The present invention discloses a power management circuit, and a control circuit and a control method thereof. The power management circuit converts an input voltage at an input terminal to an output voltage at an output terminal, and charges a battery from the output terminal. The present invention detects a power supplying capability of the input terminal to generate an adjustment signal, and adjusts the output voltage according to the adjustment signal.

15 Claims, 10 Drawing Sheets

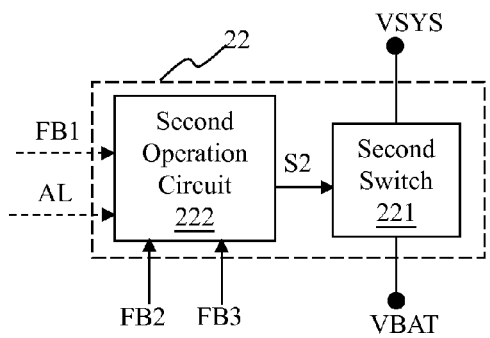
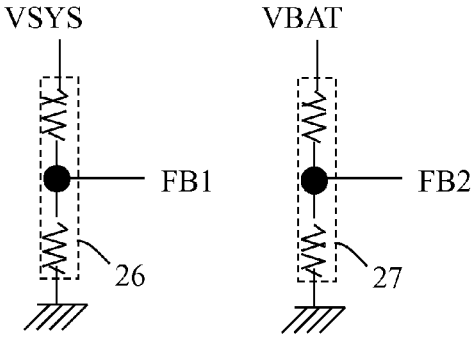
Fig. 3A  Fig. 3B
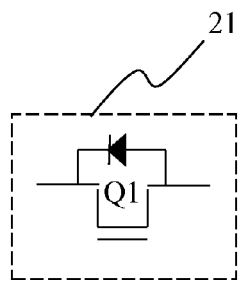
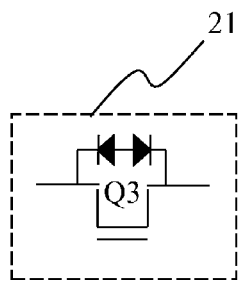
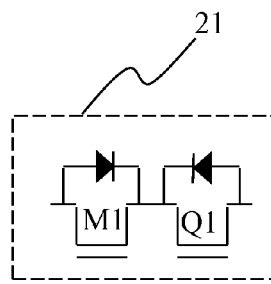
Fig. 4A  Fig. 4B  Fig. 4C
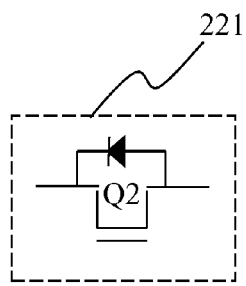
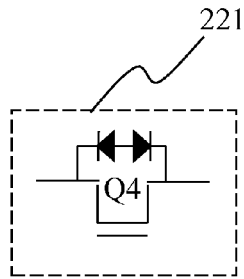
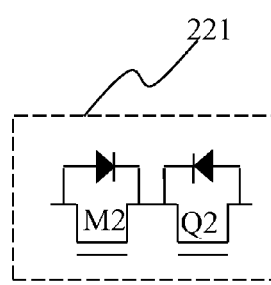
Fig. 5A  Fig. 5B  Fig. 5C

1

POWER MANAGEMENT CIRCUIT, AND CONTROL CIRCUIT AND CONTROL METHOD THEREOF

BACKGROUND OF THE INVENTION

Field of Invention

The present invention relates to a power management circuit, and a control circuit and a control method thereof; particularly, it relates to such power management circuit, and control circuit and control method thereof, which are capable of adjusting the output voltage according to a power supplying capability of the input terminal to improve the power supply efficiency.

Description of Related Art

Please refer to FIG. 1A in conjugation with FIG. 1B. FIG. 1A shows a schematic diagram of a conventional power management circuit. FIG. 1B shows an embodiment of the first operation circuit of the prior art. The power management circuit 10 is capable of converting an input voltage VIN at an input terminal IN to an output voltage VSYS at an output terminal SYS and charging a battery BAT from the output terminal SYS. The input terminal IN can be coupled to an external power source 18 to receive power supply from the external power source 18, so that an input current Iin is supplied from the input terminal IN. The output terminal SYS can be coupled to a load 19 to provide the output voltage VSYS to the load 19 from the output terminal SYS. As shown in FIG. 1A, the power management circuit 10 comprises a first linear regulator 11 and a second linear regulator 12. The first linear regulator 11 and the second linear regulator 12 for example are low-dropout regulators (LDO), respectively. The first linear regulator 11 includes a first switch 111 and a first operation circuit 112. The first operation circuit 112 generates a first operation signal S1' which controls an operation of the first switch 111. As shown in FIG. 1B, the first operation circuit 112 includes an error amplifier EA1'. The error amplifier EA1' compares a feedback signal (representing information related to the output voltage VSYS) with a reference voltage REF to generate the first operation signal S1', thus controlling the operation of the first switch 111 so that the first switch 111 is conductive and operates in its linear region. The power management circuit 10 can optionally comprise a first voltage detection device 16. The first voltage detection device 16 can be, for example, a voltage divider circuit which generates the feedback signal FB1' representing information related to the output voltage VSYS. The second linear regulator 12 having one end electrically connected to the output terminal SYS and another end electrically connected to the battery BAT. The second linear regulator 12 includes a second switch 121 and a second operation circuit 122, wherein the second switch 121 is electrically connected between the output terminal SYS and the battery BAT. When the input terminal IN receives power supplied from the external power source 18, the power supplied from the external power source 18 can support a charging current ICHG from the output terminal SYS to the battery BAT, to charge the battery BAT. Under such circumstance, the second operation circuit 122 generates a second operation signal S2' according to a feedback signal FB2' (representing information related to a battery voltage VBAT of the battery BAT) and a feedback signal FB3' (representing information related to the charging current ICHG flowing through the second switch 121), to control an operation of the second switch 121 so that the second switch 121 is conductive and operates in its linear region, thereby controlling the charging operation from the output terminal SYS to the battery BAT. The power management circuit 10 can optionally comprise a second voltage detection device 17. The second voltage detection device 17 can be, for example, a voltage divider circuit which generates the feedback signal FB2' representing information related to the battery voltage VBAT of the battery BAT.

In this prior art, the reference voltage REF shown in FIG. 1B is a constant and cannot be adjusted. Therefore, the level or regulated target of the output voltage VSYS is correspondingly a constant and cannot be adjusted. Because both the first linear regulator 11 and the second linear regulator 12 are linear regulators and the first switch 111 and the second switch 121 both operate in the linear region, there is a dilemma in determining the level of the output voltage VSYS. That is, when the level or regulated target of the output voltage VSYS is set closer to the level of the battery voltage VBAT, the power loss from the output terminal SYS to the battery BAT is lower but the power loss from the input terminal IN to the output terminal SYS is higher. On the contrary, when the level or regulated target of the output voltage VSYS is set closer to the level of the input voltage VIN, power loss from the input terminal IN to the output terminal SYS is lower but the power loss from the output terminal SYS to the battery BAT is higher. As a consequence, in the prior art, regardless whether the level of the output voltage VSYS is set closer to the level of the battery voltage VBAT or closer to the level of the input voltage VIN, there will be undesirable power loss.

In view of the above, to overcome the drawback in the prior art, the present invention proposes a power management circuit, and a control circuit and a control method thereof, which are capable of adjusting the output voltage according to a power supplying capability of the input terminal to improve the power supply efficiency.

SUMMARY OF THE INVENTION

From one perspective, the present invention provides a power management circuit for converting an input voltage at an input terminal to an output voltage at an output terminal and charging a battery from the output terminal, the power management circuit comprising: a power path management circuit having one end electrically connected to the output terminal and another end electrically connected to the battery, for controlling a charging current from the output terminal to the battery; a first switch electrically connected between the input terminal and the output terminal; a first operation circuit for generating a first operation signal at least according to the output voltage and an adjustment signal, to control an operation of the first switch, wherein the first operation circuit includes: a first error amplifier for comparing a first feedback signal related to the output voltage with a reference voltage, to generate the first operation signal; and a reference voltage adjustment circuit for adjusting the reference voltage according to the adjustment signal; and a detection circuit for determining a power supplying capability of the input terminal to generate the adjustment signal.

In one embodiment, wherein the detection circuit includes one or more of the following terminals: (1) a connecting terminal coupled to the input terminal; (2) a Data Processing (DP) terminal; (3) a Data Memorizing (DM) terminal; and/or (4) an Identifying (ID) terminal; and the detection circuit determines the power supplying capability of the input terminal according to one or more of the following approaches, to generate the adjustment signal: (1) by directly detecting the power supplying capability of the input terminal; (2) by data received by the DP terminal and/or the DM terminal; and/or (3) by data received by the DM terminal which indicates an identification of an external power source electrically connected to the input terminal.

In one embodiment, the reference voltage adjustment circuit includes one of the following circuits: a digit-to-analog conversion circuit, a mapping circuit, an amplification circuit or a sample-and-hold circuit.

In one embodiment, the reference voltage adjustment circuit includes: an adder circuit for adding a second feedback signal related to a battery voltage of the battery with an offset or a signal related to the offset, to generate a summation signal; and a selection circuit, which is responsive to the adjustment signal to: (1) select a first predetermined voltage level or a signal related to the first predetermined voltage level as the reference voltage under a circumstance where the adjustment signal indicates that the power supplying capability of the input terminal is relatively stronger; and (2) select an output of the adder as the reference voltage under a circumstance where the adjustment signal indicates that the power supplying capability of the input terminal is relatively weaker.

In one embodiment, the reference voltage adjustment circuit includes: an adder circuit for adding a second feedback signal related to a battery voltage of the battery with an offset or a signal related to the offset, to generate a summation signal; and a selection circuit, which is responsive to the adjustment signal to: (1) select a first predetermined voltage level or a signal related to the first predetermined voltage level as the reference voltage under a circumstance where the adjustment signal indicates that the power supplying capability of the input terminal is relatively stronger; and (2) select a higher one of the followings as the reference voltage: (a) a second predetermined voltage level or a signal related to the second predetermined voltage level or (b) an output of the adder, under a circumstance where the adjustment signal indicates that the power supplying capability of the input terminal is relatively weaker.

In one embodiment, the power path management circuit includes: a second switch electrically connected between the output terminal and the battery; and a second operation circuit for generating a second operation signal at least according to information related to a battery voltage of the battery and information related to the charging current, to control an operation of the second switch, so that the charging current is controlled.

In one embodiment, the first operation circuit and the first switch form a first low-dropout regulator (LDO) or a first switching power stage, and the second operation circuit and the second switch form a second low-dropout regulator (LDO) or a second switching power stage.

From another perspective, the present invention a control circuit of a power management circuit, for controlling a first switch electrically connected between an input terminal and an output terminal and a second switch electrically connected between the output terminal and a battery, so as to convert an input voltage at the input terminal to an output voltage at the output terminal and charge the battery by a charging current from the output terminal, the control circuit comprising: a first operation circuit for generating a first operation signal at least according to the output voltage and an adjustment signal, to control an operation of the first switch, wherein the first operation circuit includes: a first error amplifier for comparing a first feedback signal related to the output voltage with a reference voltage, to generate the first operation signal; and a reference voltage adjustment circuit for adjusting the reference voltage according to the adjustment signal; and a detection circuit for determining a power supplying capability of the input terminal to generate the adjustment signal.

In one embodiment, the control circuit of the power management circuit further includes: a second operation circuit for generating a second operation signal at least according to information related to a battery voltage of the battery and information related to the charging current, to control an operation of the second switch, so that the charging current is controlled.

From yet another perspective, the present invention provides a control method of a power management circuit, comprising the steps of: (A) converting an input voltage at an input terminal to an output voltage at an output terminal and charging a battery from the output terminal; (B) detecting a power supplying capability of the input terminal; (C) generating an adjustment signal according to the power supplying capability of the input terminal; and (D) adjusting a target level of the output voltage according to the adjustment signal.

In one embodiment, the step (A) includes: (A1) generating a first feedback signal according to the output voltage; and (A2) comparing the first feedback signal with a reference voltage to regulate the target level of the output voltage to a level corresponding to the reference voltage.

In one embodiment, a first switch is electrically connected between the input terminal and the output terminal and a second switch is electrically connected between the output terminal and the battery, and the step (A2) further includes: controlling an operation of the first switch or an operation of the second switch according to a comparison result between the first feedback signal and the reference voltage.

In one embodiment, the step (D) includes: adjusting the output voltage according to the adjustment signal according to the adjustment signal by two steps, by multiple steps more than two, or continuously.

In one embodiment, the step (D) includes: setting the target level of the output voltage as a first constant under a circumstance where the adjustment signal indicates that the power supplying capability of the input terminal is relatively stronger, wherein the first constant is relatively closer to a level of the input voltage; and under a circumstance where the adjustment signal indicates that the power supplying capability of the input terminal is relatively weaker, setting the target level of the output voltage as one of the followings: (1) setting the target level of the output voltage as a second constant, wherein the second constant is relatively closer to a level of the battery voltage; (2) setting the target level of the output voltage to vary dependent on the power supplying capability of the input terminal; (3) setting the target level of the output voltage to be determined by a sum of an offset plus the battery voltage; or (4) setting the target level of the output voltage to be determined by a higher one of (a) the sum of the offset plus the battery voltage and (b) a predetermined voltage level.

The objectives, technical details, features, and effects of the present invention will be better understood with regard to the detailed description of the embodiments below, with reference to the attached drawings.

BRIEF DESCRIPTION OF THE DRAWINGS

FIG. 3A shows an embodiment of the power path management circuit of the present invention.

FIG. 3B shows an embodiment of the first voltage detection device and an embodiment of the second voltage detection device of the present invention.

FIGS. 4A-4C show several embodiments of the first switch, in which the first switch is a power transistor.

FIGS. 5A-5C show several embodiments of the second switch, in which the second switch is a power transistor.

DESCRIPTION OF THE PREFERRED EMBODIMENTS

Figure 1A:
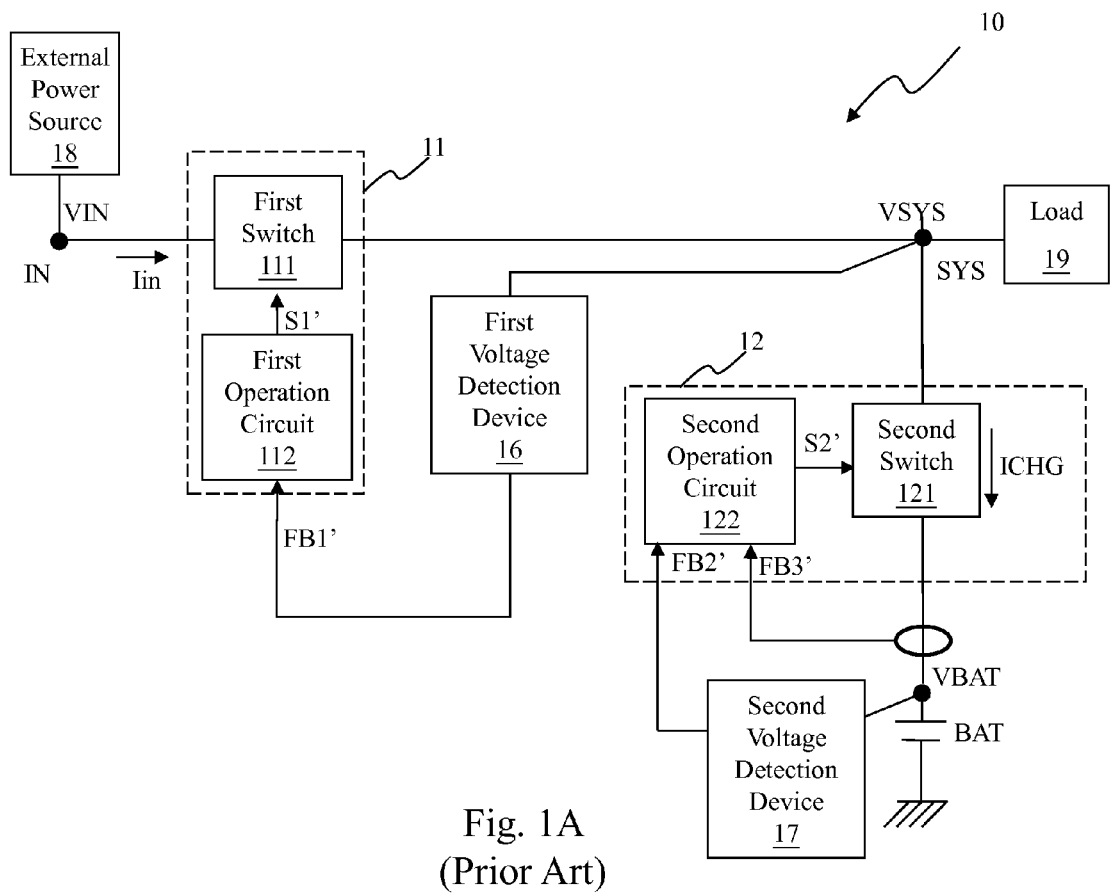
FIG. 1A shows a schematic diagram of a conventional power management circuit.
Figure 1B:
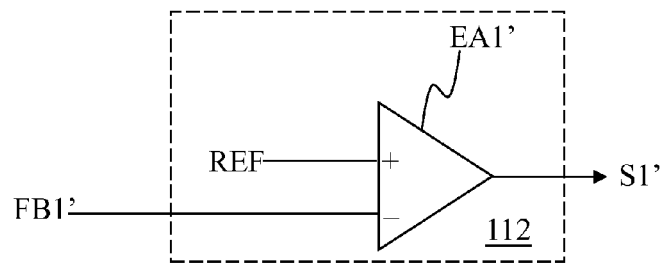
FIG. 1B shows an embodiment of the first operation circuit of the prior art.

The above and other technical details, features and effects of the present invention will be will be better understood with regard to the detailed description of the embodiments below, with reference to the drawings. In the description, the words relate to directions such as "on", "below", "left", "right", "forward", "backward", etc. are used to illustrate relative orientations in the drawings and should not be considered as limiting in any way. The drawings as referred to throughout the description of the present invention are for illustration only, to show the interrelations between the apparatus and the devices, but not drawn according to actual scale.

Figure 2:
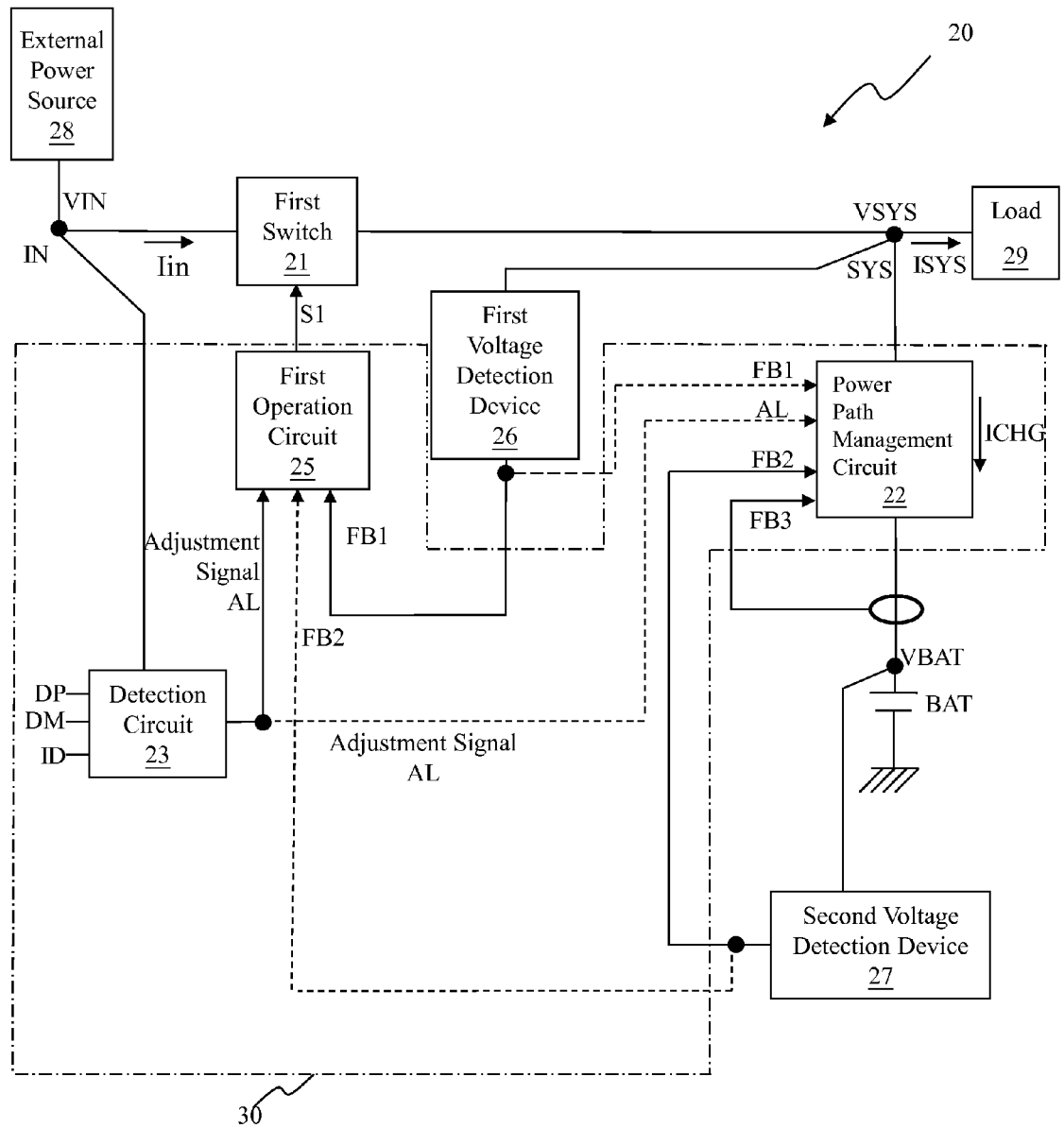
FIG. 2 shows a schematic diagram of a power management circuit according to an embodiment of the present invention.

Please refer to FIG. 2, which shows a schematic diagram of a power management circuit according to an embodiment of the present invention. The power management circuit 20 is capable of converting an input voltage VIN at an input terminal IN to an output voltage VSYS at an output terminal SYS and charging a battery BAT from the output terminal SYS. The input terminal IN can be coupled to an external power source 28 to receive power supply from the external power source 28, so that an input current Iin is supplied from the input terminal. The output terminal SYS can be coupled to a load 29 to provide the output voltage VSYS to the load 29 from the output terminal SYS. As shown in FIG. 2, the power management circuit 20 comprises a first switch 21, a first operation circuit 25, a power path management circuit 22 and a detection circuit 23. The first switch 21 is electrically connected between the input terminal IN and the output terminal SYS. The first operation circuit 25 generates a first operation signal S1 to control an operation of the first switch 21. The first operation circuit 25 generates the first operation signal S1 according to a feedback signal FB1 representing information related to the output voltage VSYS (e.g., the output voltage VSYS itself or its divided voltage) and an adjustment signal AL generated by the detection circuit 23, to control the operation of the first switch 21. The details as to how the first operation circuit 25 generates the first operation signal S1 and the details of the adjustment signal AL will be described later.

Please refer to FIG. 3A, which shows an embodiment of the power path management circuit of the present invention. The power path management circuit 22 has one end electrically connected to the output terminal SYS and another end electrically connected to the battery BAT. The power path management circuit 22 includes a second switch 221 and a second operation circuit 222, wherein the second switch 221 is electrically connected between the output terminal SYS and the battery BAT. When the input terminal IN receives power supplied from the external power source 28, the power supplied from the external power source 28 can support a charging current ICHG from the output terminal SYS to the battery BAT, to charge the battery BAT. Under such circumstance, the second operation circuit 222 generates a second operation signal S2 according to a feedback signal FB2 (representing information related to a battery voltage VBAT of the battery BAT) and a feedback signal FB3 (representing information related to the charging current ICHG flowing through the second switch 221), to control an operation of the second switch 221 and thereby control the charging operation from the output terminal SYS to the battery BAT.

Still referring to FIG. 2, in addition to the above-mentioned arrangement, the control mechanism of the power path management circuit can also be arranged as follow: the first operation circuit 25 generate the first operation signal S1 according to the feedback signal FB1 (representing information related to the output voltage VSYS), the feedback signal FB2 (representing information related to the battery voltage VBAT of the battery BAT, shown by dashed line) and the adjustment signal AL, to control the operation of the first switch 21; the second operation circuit 222 generate the second operation signal S2 according to the feedback signal FB3 (representing information related to the charging current ICHG flowing through the second switch 221), to control the operation of the second switch 221. Or, in an alternative case, the second operation circuit 222 can generate the second operation signal S2 according to both the feedback signal FB2 and the feedback signal FB3, to control the operation of the second switch 221.

In another embodiment, the control mechanism of the power path management circuit can also be arranged as follow: the first operation circuit 25 generate the first operation signal S1 according to the feedback signal FB2 (representing information related to the battery voltage VBAT of the battery BAT, as shown in dashed line), to control the operation of the first switch 21; the second operation circuit 222 generate the second operation signal S2 according to the feedback signal FB1 (representing information related to the output voltage VSYS, as shown in dashed line), the feedback signal FB3 (representing information related to the charging current ICHG flowing through the second switch 221, shown by dashed line) and the adjustment signal AL (shown by dashed line), to control the operation of the second switch 221.

The above-mentioned embodiments have a common feature, which is: adjusting the target level of the output voltage VSYS according to the adjustment signal AL. The details of such common feature will be described later.

In one embodiment, the power management circuit 20 can optionally comprise a first voltage detection device 26 to detect the output voltage VSYS and a second voltage detection device 27 to detect the battery voltage VBAT. However, the first voltage detection device 26 and the second voltage detection device 27 can be omitted if the first operation circuit 25 is capable of receiving a signal having a voltage level as high as the output voltage VSYS and if the power path management circuit 22 is capable of receiving a signal having a voltage level as high as the battery voltage VBAT. Please refer to FIG. 3B, which shows an embodiment of the first voltage detection device 26 and an embodiment of the second voltage detection device 27 of the present invention. The first voltage detection device 26 and the second voltage detection device 27 can each be, for example, a voltage divider circuit including two resistors connected to each other in series. The feedback signals FB1 and FB2 are extracted from the voltage difference across one of the resistors.

In one embodiment, the charging current ICHG flowing through the second switch 121 can be detected by, for example but not limited to, a current detection device (not shown in FIG. 2). The current detection device can be, for example but not limited to, a sensing transistor connected to the second switch 121 in parallel or a sensing resistor connected in the path of the charging current ICHG in series. There are many approaches for current detection, and the scope of the present invention is not limited to anyone of them. The feedback signal FB3 can be used to perform a feedback control by a feedback control loop, which is well known to those skilled in the art, and therefore is not redundantly explained here.

Please refer to FIGS. 4A-4C, which show several embodiments of the first switch, an also please refer to FIGS. 5A-5C, which show several embodiments of the second switch. In one embodiment, the first switch 21 can be, for example but not limited to, a first power transistor Q1 (as shown in FIG. 4A), and the second switch 221 can be, for example but not limited to, a second power transistor Q2 (as shown in FIG. 5A). The first power transistor Q1 and the second power transistor Q2 can be, for example but not limited to, an NMOS transistor or a PMOS transistor. The first switch 21 for example cooperates with the first operation circuit 25 to form a first low-dropout regulator (LDO) and the second switch 221 for example cooperates with the second operation circuit 222 to form a second low-dropout regulator (LDO).

If it is desired to prevent a reverse current from flowing in a reverse direction, the first switch 21 can include a transistor Q3 whose parasitic diode polarity is adjustable (as shown in FIG. 4B) and the second switch 221 can include a transistor Q4 whose parasitic diode polarity is adjustable (as shown in FIG. 5B). Or, in another embodiment, the first switch 21 can include two transistors M1 and Q1 (as shown in FIG. 4C) connected in series, wherein each of the two transistors M1 and Q1 connected in series has a parasitic diode whose polarity is opposite to the other. The second switch 221 can include two transistors M2 and Q2 (as shown in FIG. 5C) connected in series, wherein each of the two transistors M2 and Q2 connected in series has a parasitic diode whose polarity is opposite to the other. That is, the first operation signal S1 generated by the first operation circuit 25 or the second operation signal S2 generated by the second operation circuit 222 controls the two transistors connected in series, or, the first operation circuit 25 or the second operation circuit 222 at least controls the transistor having the parasitic diode whose polarity is opposite to the current direction.

Figure 6A:
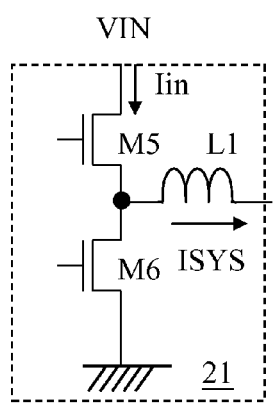
FIGS. 6A-6H respectively show that when the first switch is a switching power stage, the first switch can be a synchronous or asynchronous buck, boost, inverting or buck-boost switching power stage.
Figure 6B:
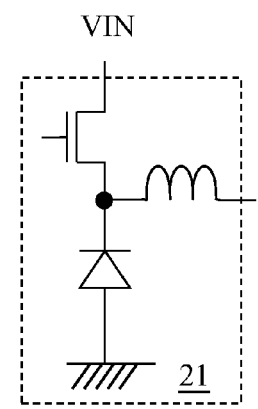
Figure 6C:
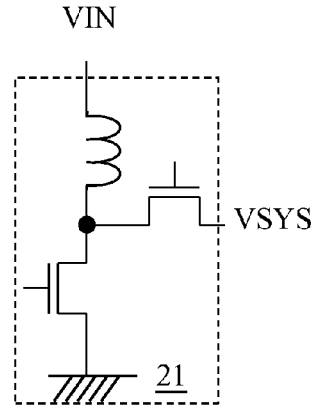
Figure 6D:
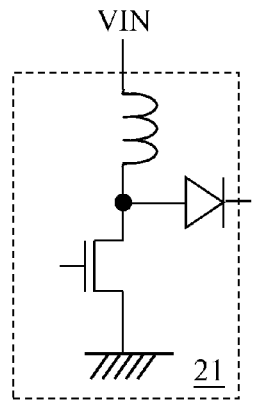
Figure 6E:
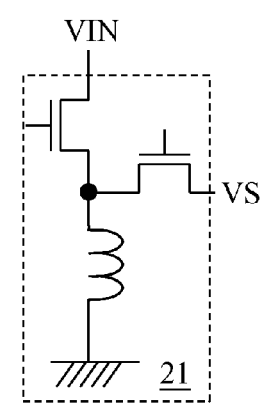
Figure 6F:
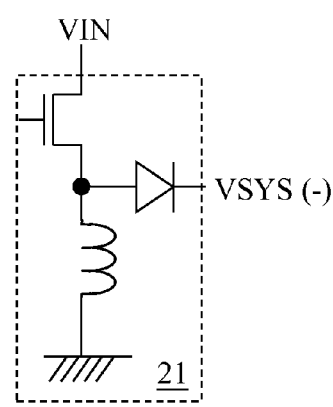
Figure 6G:
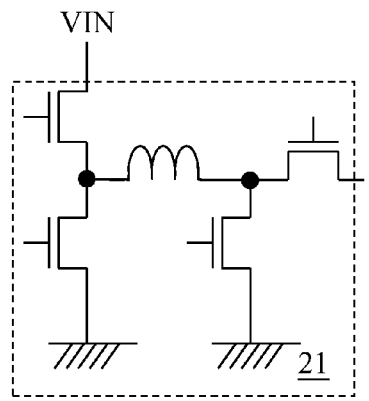
Figure 6H:
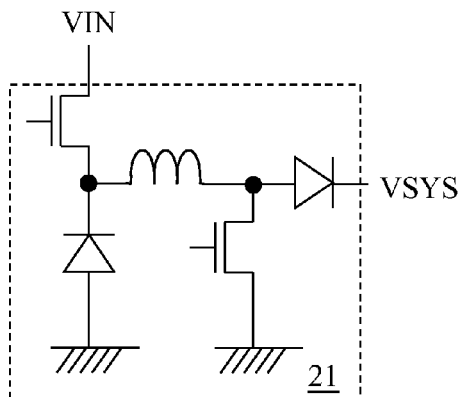
Figure 7A:
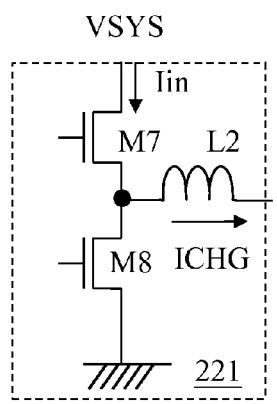
FIGS. 7A-7H respectively show that when the second switch is a switching power stage, the second switch can be a synchronous or asynchronous buck, boost, inverting or buck-boost switching power stage.
Figure 7B:
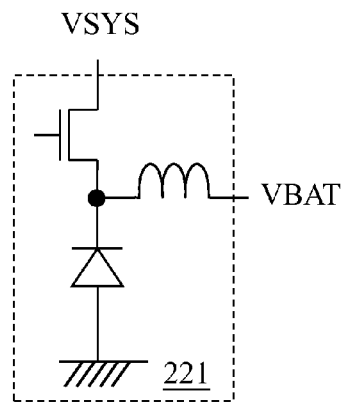
Figure 7C:
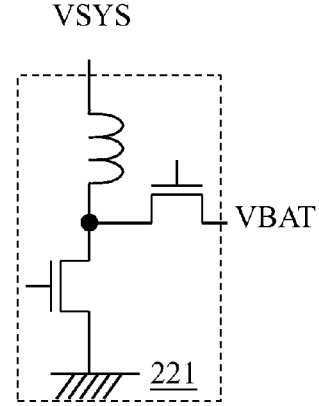
Figure 7D:
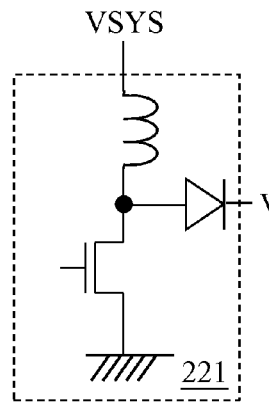
Figure 7E:
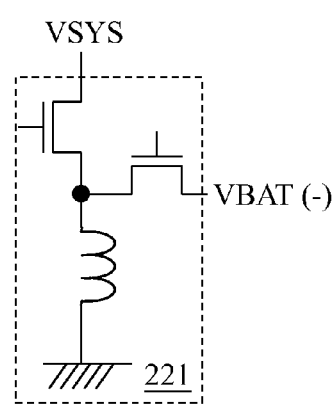
Figure 7F:
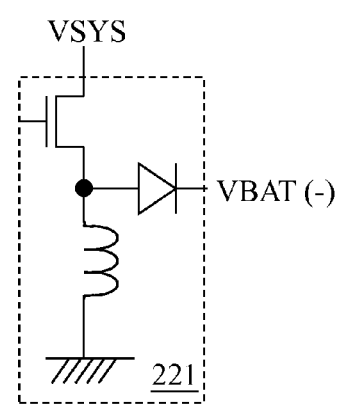
Figure 7G:
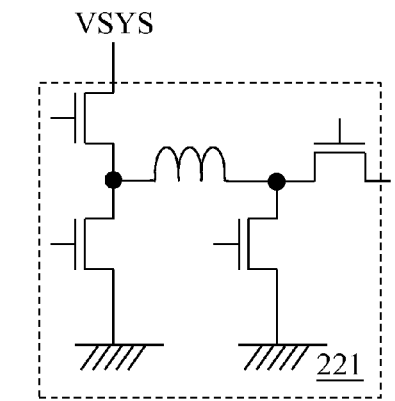
Figure 7H:
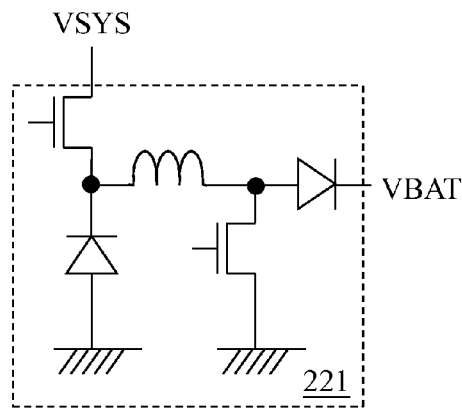

In addition to forming the first low-dropout regulator (LDO), in another embodiment, the first switch 21 can be, for example but not limited to, a power transistor switch of a first switching power stage, and the second switch 221 can be, for example but not limited to, a second power transistor switch of a second switching power stage. The first switching power stage can be a synchronous or asynchronous buck, boost, inverting or buck-boost switching power stage, as respectively shown in FIGS. 6A-6H. For example, the first switching power stage can include a first upper gate switch M5, a first lower gate switch M6 and a first inductor L1, as shown in FIG. 6A. The second switching power stage can be a synchronous or asynchronous buck, boost, inverting or buck-boost switching power stage, as respectively shown in FIGS. 7A-7H. For example, the second switching power stage can include a second upper gate switch M7, a second lower gate switch M8 and a second inductor L2, as shown in FIG. 7A. As such, the first operation circuit 25 and the first switch 21 can form, for example but not limited to, a first switching regulator, and the second operation circuit 222 and the second switch 221 can form, for example but not limited to, a second switching regulator. The details as to how the first switching regulator and the second switching regulator generate the first operation signal S1 and the second operation signal S2 are well known to those skilled in the art, which are not redundantly explained here.

An embodiment as to how the present invention adjusts the target level of the output voltage VSYS according to the adjustment signal AL is described below. Please refer to FIG. 8, which shows an embodiment of the first operation circuit of the present invention. As shown in the figure, the detection circuit 23 determines a power supplying capability of the input terminal IN (i.e., the power supplying capability of the external power source 28) and generates the adjustment signal AL in correspondence to the power supplying capability of the input terminal IN. The adjustment signal AL can be a digital signal having one or more bits or an analog signal. The detection circuit 23 can determine the power supplying capability of the input terminal IN according to, for example but not limited to, one or more of the following approaches: (1) By directly detecting the power supplying capability of the input terminal IN, such as by detecting whether the level of the input voltage Vin drops after extracting a current from the input terminal IN; and/or (2) by data received by a Data Processing (DP) terminal and/or a Data Memorizing (DM) terminal; and/or (3) by data received by a Data Memorizing (DM) terminal which indicates an identification of the external power source 28. The data received by the DP terminal and/or DM terminal can indicate the power supplying capability of the input terminal IN, and the identification of the external power source 28 can indicate the power supplying capability of the external power source 28. If only one of the above-mentioned approaches is adopted, then the terminals which are not required can be omitted (i.e., the detection circuit 23 does not necessarily include all four terminals of (1) the connecting terminal coupled to the input terminal IN; (2) the DP terminal; (3) the DM terminal; and (4) the ID terminal").

Figure 8:
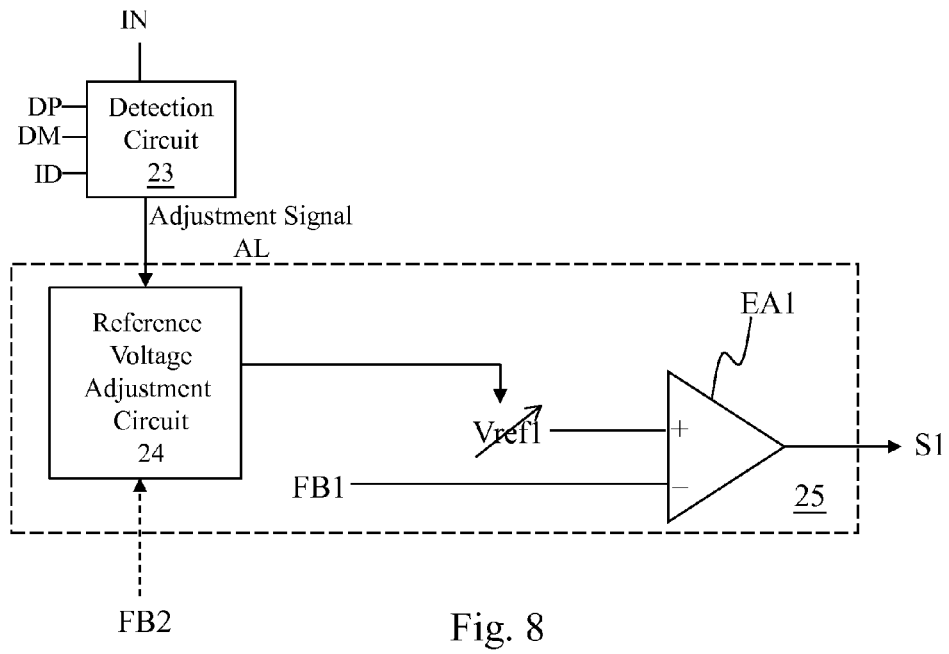
FIG. 8 shows an embodiment of the first operation circuit of the present invention.

In the embodiment shown in FIG. 8, the first operation circuit 25 includes a reference voltage adjustment circuit 24 and a first error amplifier EA1. The first error amplifier EA1 compares the feedback signal FB1 (representing information related to the output voltage VSYS, which for example can be the output voltage VSYS or its divided voltage) with an adjustable reference voltage Vref1, to generate the first operation signal S1 so as to control the first switch 21 is under control (referring to FIG. 2). According to feedback control mechanism, in a voltage feedback control loop for the output voltage VSYS, the two input terminals of the first error amplifier EA1 will be substantially at a same level when the circuit is under balance (assuming that the internal offset of the first error amplifier EA1 is neglected). Therefore, by adjusting the reference voltage Vref1 according to the output (the adjustment signal AL) of the detection circuit 23, the reference voltage adjustment circuit 24 can control the level of the feedback signal FB1, that is, to regulate the target level of the output voltage VSYS at a level corresponding to the reference voltage Vref1. In one embodiment, the adjustment signal AL outputted by the detection circuit 23 can be, for example, a digit signal, and the reference voltage adjustment circuit 24 can be, for example, a digit-to-analog conversion circuit or a mapping circuit which generates a corresponding analog output in response to an inputted digit signal. Or, in another embodiment, the adjustment signal AL outputted by the detection circuit 23 can be, for example, an analog signal, and the reference voltage adjustment circuit 24 can be, for example, an amplification circuit or a sample-and-hold circuit. The digit-to-analog conversion circuit, the mapping circuit, the amplification circuit and the sample-and-hold circuit are well known to those skilled in the arts, and therefore how these circuits operate are not redundantly explained here.

Figure 9:
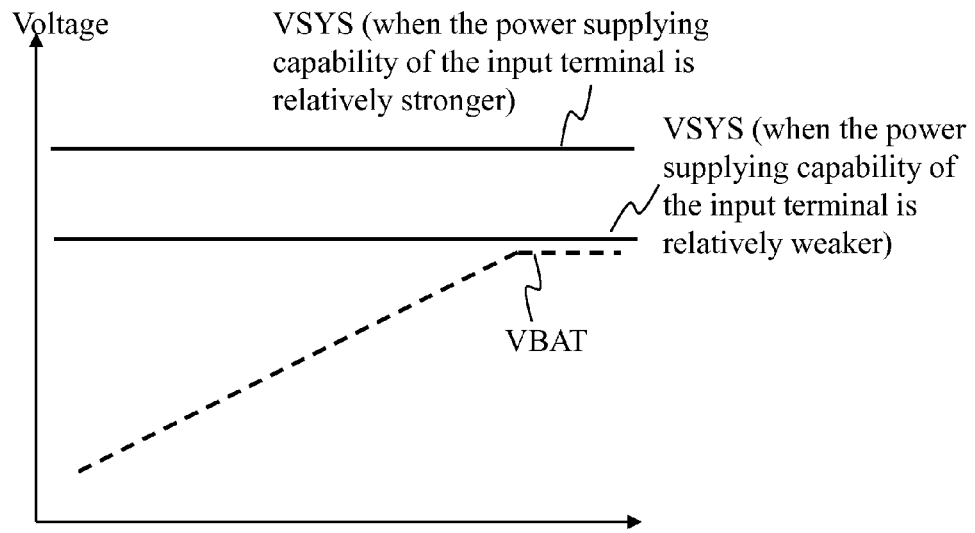
FIG. 9 shows an embodiment as to how a target level of the output voltage VSYS is adjusted.
Figure 10A:
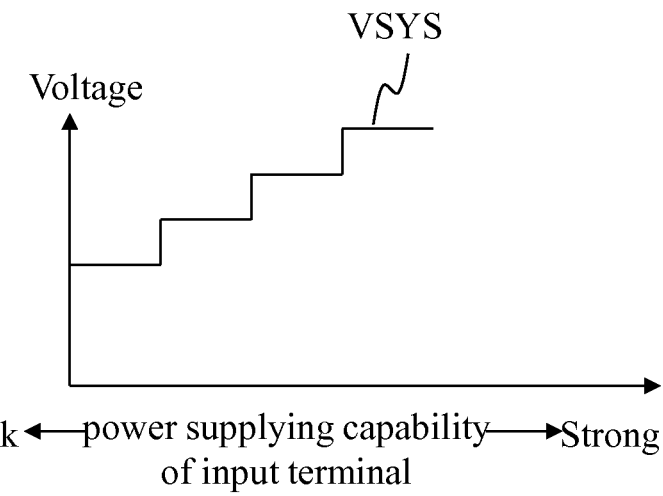
FIGS. 10A-10B show two embodiments as to how the output voltage VSYS is adjusted step-wisely or continuously according to the power supplying capability of the input terminal VIN.
Figure 10B:
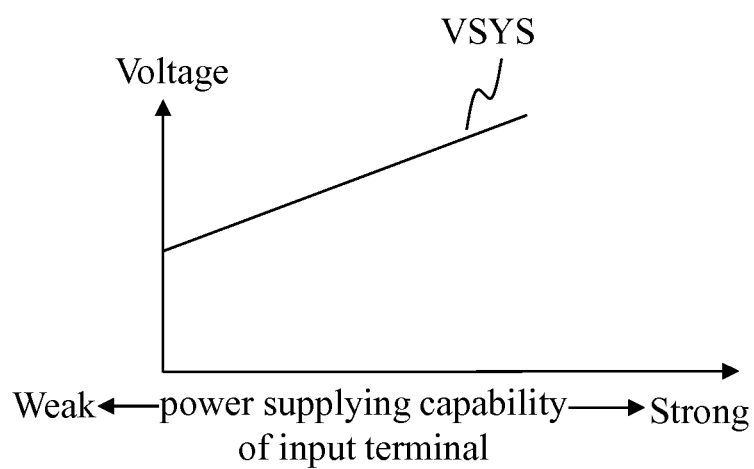

Please refer to FIG. 8 in conjugation with FIG. 9. FIG. 9 shows an embodiment as to how a target level of the output voltage VSYS is adjusted. In this embodiment, the target level of the output voltage VSYS is adjusted to a higher level under a circumstance where the power supplying capability of the input terminal IN is relatively stronger. On the contrary, the target level of the output voltage VSYS is adjusted to a lower level under a circumstance where the power supplying capability of the input terminal IN is relatively weaker. There are two target levels for the output voltage VSYS shown in FIG. 9, but certainly more target levels for the output voltage VSYS can be provided, and the output voltage VSYS can be adjusted step-wisely or continuously according to the power supplying capability of the input terminal VIN, as shown in FIGS. 10A-10B. As one of average skill in the art will appreciate, the term "the power supplying capability of the input terminal IN is relatively stronger", as used herein, means that the input terminal IN can supply a greater amount of current while its voltage level does not drop significantly. On the contrary, the term "the power supplying capability of the input terminal IN is relatively weaker", as used herein, indicates an opposite situation to the above-mentioned situation. As for the definition of "greater amount of current", it can be determined depending on practical needs.

Figure 11:
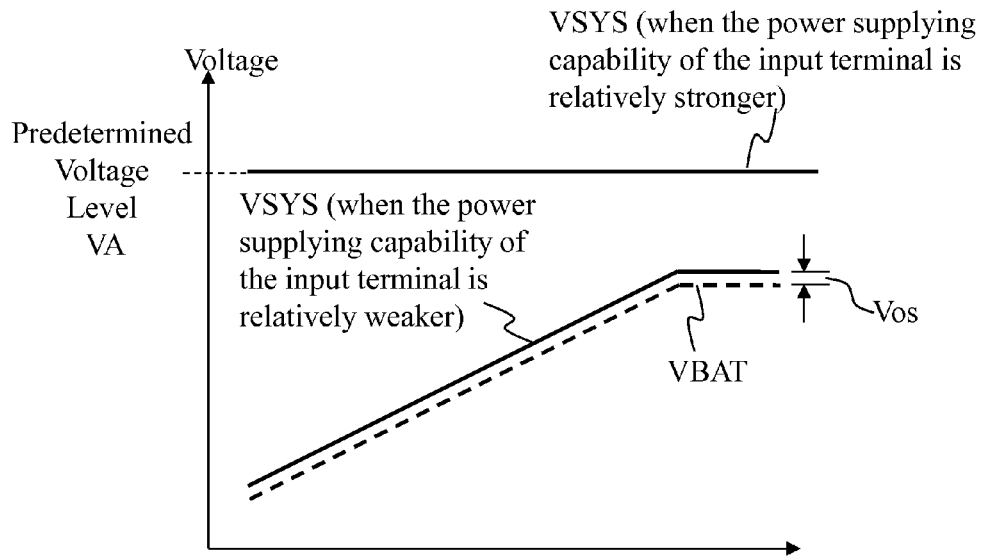
FIGS. 11-12 show two other embodiments as to how a target level of the output voltage VSYS is adjusted.

Please refer to FIG. 11, which shows another embodiment as to how a target level of the output voltage VSYS is adjusted. In this embodiment, the target level of the output voltage VSYS is adjusted to a higher level (a predetermined voltage level VA) under a circumstance where the power supplying capability of the input terminal IN is relatively stronger. Under a circumstance where the power supplying capability of the input terminal IN is relatively weaker, the target level of the output voltage VSYS is dependent upon the battery voltage VBAT, in which there is an offset Vos between the output voltage VSYS and the battery voltage VBAT (i.e., the output voltage VSYS is determined by a sum of the offset Vos plus the battery voltage VBAT).

Figure 12:
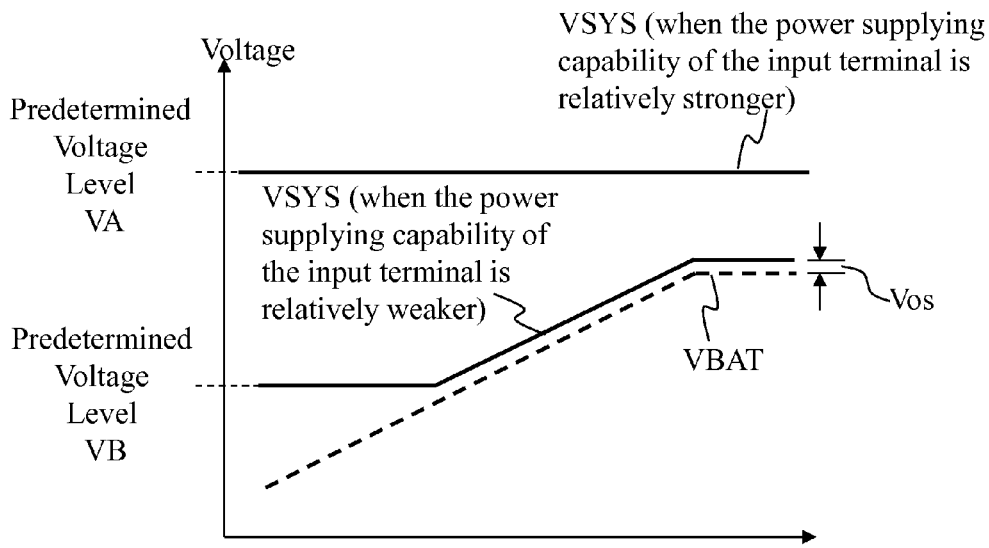

Please refer to FIG. 12, which shows yet another embodiment as to how a target level of the output voltage VSYS is adjusted. In this embodiment, the target level of the output voltage VSYS is adjusted to a higher level (a predetermined voltage level VA) under a circumstance where the power supplying capability of the input terminal IN is relatively stronger. Under a circumstance where the power supplying capability of the input terminal IN is relatively weaker, the target level of the output voltage VSYS is determined by a higher one of (1) the sum of the offset Vos plus the battery voltage VBAT and (2) a predetermined voltage level VB. The purpose for such arrangement is to prevent the output voltage VSYS from being lower than the predetermined voltage level VB, so that the load 29 receiving the output voltage VSYS (referring to FIG. 2) can operate normally.

Figure 13:
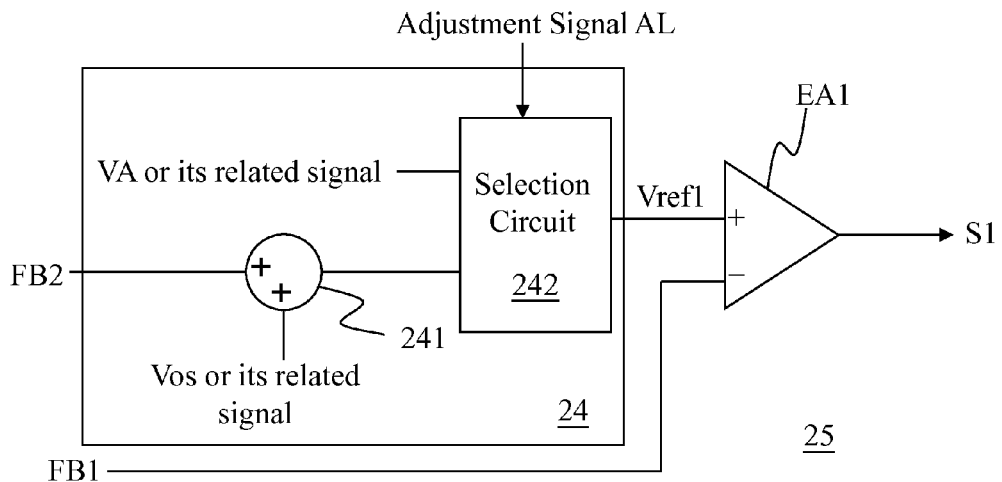
FIGS. 13-14 show two other embodiments of the first operation circuit of the present invention.

Corresponding to the embodiments shown in FIGS. 11-12, the reference voltage adjustment circuit 24 (referring to FIG. 8) can further receive the feedback signal FB2 (representing information related to the battery voltage VBAT of the battery BAT) and adjust the reference voltage Vref1 according to the adjustment AL and the feedback signal FB2. More specifically, FIG. 13 shows an embodiment of the first operation circuit 25 and the reference voltage adjustment circuit 24 which can be applied to the embodiment shown in FIG. 11. The first operation circuit 25 includes a reference voltage adjustment circuit 24 and an error amplifier EA1. The reference voltage adjustment circuit 24 includes an adder circuit 241 and a selection circuit 242. The adder circuit 241 adds the feedback signal FB2 with the offset Vos or its related signal. The selection circuit 242 selects the predetermined voltage level VA (or its related signal) or an output of the adder 241 as the reference voltage Vref1 according to the adjustment signal AL. The term "or its related signal" is used for the reason that: if the feedback signal FB2 is a divided voltage of the battery voltage VBAT, which is proportional to the battery voltage VBAT but is not the battery voltage VBAT itself, then the offset Vos should be multiplied by the same proportional rate to become the "related signal" before it is added with the feedback signal FB2 so that it will be mathematically correct. Likely, if the feedback signal FB1 represents a divided voltage of the output voltage VSYS, which is proportional to the output voltage VSYS, the predetermined voltage level VA should be multiplied by a corresponding proportional rate to become the "related signal" and then inputted to the selection circuit 242.

Figure 14:
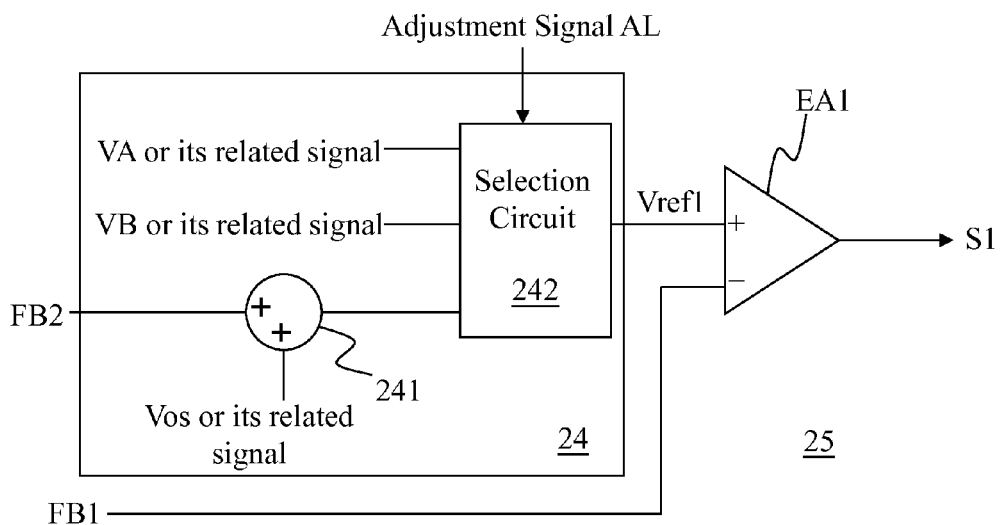

FIG. 14 shows an embodiment of the first operation circuit 25 and the reference voltage adjustment circuit 24 which can be applied to the embodiment shown in FIG. 12. This embodiment is similar to the embodiment shown in FIG. 13, but is different in that: the selection circuit 242 determines whether to select the predetermined voltage level VA (or its related signal) as the reference voltage Vref1 according to the adjustment signal AL, and if it is determined no, the selection circuit 242 selects a higher one of the followings: (1) a predetermined voltage level VB or its related signal or (2) the output of the adder 241, as the reference voltage Vref1.

The above-mentioned embodiments explain the case where the first operation circuit 25 receives the feedback signal FB1 and the adjustment signal AL. If it is the second operation circuit 222 (referring to FIG. 3A) which receives the feedback signal FB1 and the adjustment signal AL, it can be implemented in similar ways, which is not redundantly repeated here.

Figure 15:
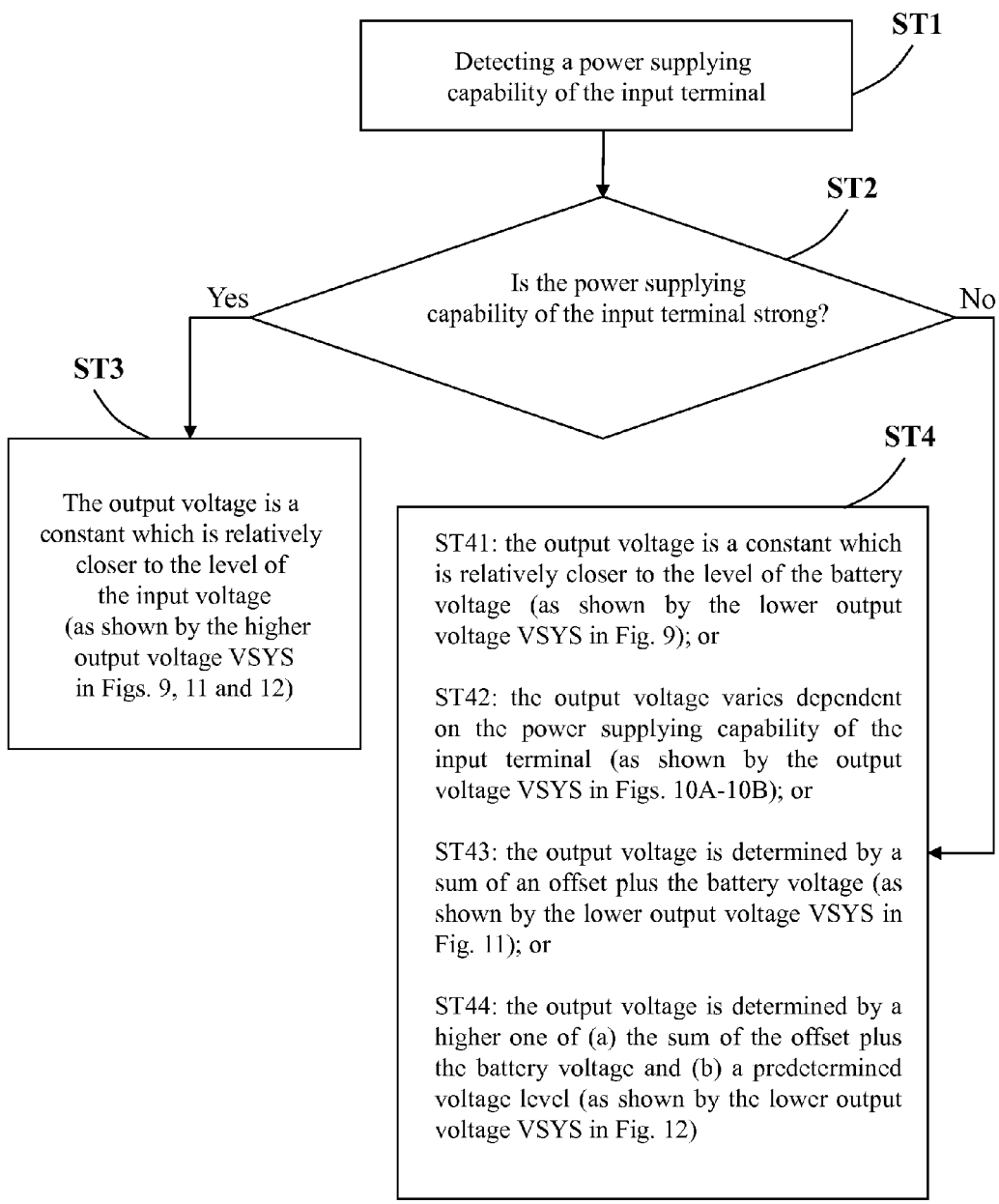
FIG. 15 shows a flowchart of a control method of the power management circuit according to an embodiment of the present invention.

Please refer to FIG. 15, which shows a flowchart of a control method of the power management circuit according to an embodiment of the present invention. First, the power management circuit detects a power supplying capability of the input terminal IN (the step ST1). Next, the power management circuit determines whether the power supplying capability of the input terminal IN is strong or weak (the step ST2). Under a circumstance where the power supplying capability of the input terminal IN is relatively stronger, the target level of the output voltage VSYS is set to a constant which is relatively closer to the level of the input voltage VIN (the step ST3), as shown by the higher output voltage VSYS in FIGS. 9, 11 and 12. Under a circumstance where the power supplying capability of the input terminal IN is relatively weaker, in the step ST4, the target level of the output voltage VSYS can be set according to one of the followings:

the step ST41: the target level of the output voltage VSYS is set to another constant which is relatively closer to a level of the battery voltage VBAT (as shown by the lower output voltage VSYS in FIG. 9); or the step ST42: the target level of the output voltage VSYS varies, dependent on the power supplying capability of the input terminal IN (as shown by the output voltage VSYS in FIGS. 10A-10B); or the step ST43: the target level of the output voltage VSYS is determined by a sum of the offset Vos plus the battery voltage VBAT (as shown by the lower output voltage VSYS in FIG. 11); or the step ST44: the target level of the output voltage VSYS is determined by a higher one of (a) the sum of the offset Vos plus the battery voltage VBAT and (b) a predetermined voltage level VB (as shown by the lower output voltage VSYS in FIG. 12).

In one embodiment, all or some of the first operation circuit 25, the power path management circuit 22 and the detection circuit 23 can be integrated into a control circuit 30 as an integrated circuit by a semiconductor manufacturing process.

The present invention is capable of adjusting the output voltage VSYS according to the reference voltage Vref1 in correspondence to the power supplying capability of the input terminal IN, thereby greatly improving the power supply efficiency.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A power management circuit for converting an input voltage at an input terminal to an output voltage at an output terminal and charging a battery from the output terminal, the power management circuit comprising:
    a power path management circuit having one end electrically connected to the output terminal and another end electrically connected to the battery, for controlling a charging current from the output terminal to the battery;
    a first switch electrically connected between the input terminal and the output terminal;
    a first operation circuit for generating a first operation signal at least according to the output voltage and an adjustment signal, to control an operation of the first switch, wherein the first operation circuit includes:
        a first error amplifier for comparing a first feedback signal related to the output voltage with a reference voltage, to generate the first operation signal; and
        a reference voltage adjustment circuit for adjusting the reference voltage according to the adjustment signal; and
    a detection circuit for determining a power supplying capability of the input terminal to generate the adjustment signal.

2. The power management circuit of claim 1, wherein the detection circuit includes one or more of the following terminals:
    (1) a connecting terminal coupled to the input terminal;
    (2) a Data Processing (DP) terminal;
    (3) a Data Memorizing (DM) terminal; and/or
    (4) an Identifying (ID) terminal; and
    the detection circuit determines the power supplying capability of the input terminal according to one or more of the following approaches, to generate the adjustment signal:
    (1) by directly detecting the power supplying capability of the input terminal;
    (2) by data received by the DP terminal and/or the DM terminal; and/or
    (3) by data received by the DM terminal which indicates an identification of an external power source electrically connected to the input terminal.

3. The power management circuit of claim 1, wherein the reference voltage adjustment circuit includes one of the following circuits: a digit-to-analog conversion circuit, a mapping circuit, an amplification circuit or a sample-and-hold circuit.

4. The power management circuit of claim 1, wherein the reference voltage adjustment circuit includes:
    an adder circuit for adding a second feedback signal related to a battery voltage of the battery with an offset or a signal related to the offset, to generate a summation signal; and
    a selection circuit, which is responsive to the adjustment signal to:
    (1) select a first predetermined voltage level or a signal related to the first predetermined voltage level as the reference voltage under a circumstance where the adjustment signal indicates that the power supplying capability of the input terminal is in a first state; and
    (2) select an output of the adder as the reference voltage under a circumstance where the adjustment signal indicates that the power supplying capability of the input terminal is in a second state, wherein the second state is a power supplying capability that is weaker than the first state.

5. The power management circuit of claim 1, wherein the reference voltage adjustment circuit includes:
    an adder circuit for adding a second feedback signal related to a battery voltage of the battery with an offset or a signal related to the offset, to generate a summation signal; and a selection circuit, which is responsive to the adjustment signal to:
(1) select a first predetermined voltage level or a signal related to the first predetermined voltage level as the reference voltage under a circumstance where the adjustment signal indicates that the power supplying capability of the input terminal is in a first state; and
(2) select a higher one of the followings as the reference voltage: (a) a second predetermined voltage level or a signal related to the second predetermined voltage level or (b) an output of the adder, under a circumstance where the adjustment signal indicates that the power supplying capability of the input terminal is in a second state, wherein the second state is a power supplying capability that is weaker than the first state.

6. The power management circuit of claim 1, wherein the power path management circuit includes:
   a second switch electrically connected between the output terminal and the battery; and
   a second operation circuit for generating a second operation signal at least according to information related to a battery voltage of the battery and information related to the charging current, to control an operation of the second switch, so that the charging current is controlled.

7. The power management circuit of claim 6, wherein the first operation circuit and the first switch form a first low-dropout regulator (LDO) or a first switching power stage, and the second operation circuit and the second switch form a second low-dropout regulator (LDO) or a second switching power stage.

8. A control circuit of a power management circuit, for controlling a first switch electrically connected between an input terminal and an output terminal and a second switch electrically connected between the output terminal and a battery, so as to convert an input voltage at the input terminal to an output voltage at the output terminal and charge the battery from the output terminal, the control circuit comprising:
   a first operation circuit for generating a first operation signal at least according to the output voltage and an adjustment signal, to control an operation of the first switch, wherein the first operation circuit includes:
      a first error amplifier for comparing a first feedback signal related to the output voltage with a reference voltage, to generate the first operation signal; and
      a reference voltage adjustment circuit for adjusting the reference voltage according to the adjustment signal; and
   a detection circuit for determining a power supplying capability of the input terminal to generate the adjustment signal,
   wherein the reference voltage adjustment circuit includes:
   an adder circuit for adding a second feedback signal related to a battery voltage of the battery with an offset or a signal related to the offset, to generate a summation signal; and
   a selection circuit, which is responsive to the adjustment signal to:
   (1) select a first predetermined voltage level or a signal related to the first predetermined voltage level as the reference voltage under a circumstance where the adjustment signal indicates that the power supplying capability of the input terminal is in a first state; and
   (2) select an output of the adder as the reference voltage under a circumstance where the adjustment signal indicates that the power supplying capability of the input terminal is in a second state, wherein the second state is a power supplying capability that is weaker than the first state.

9. The control circuit of the power management circuit of claim 8, wherein the detection circuit includes one or more of the following terminals:
   (1) a connecting terminal coupled to the input terminal;
   (2) a Data Processing (DP) terminal;
   (3) a Data Memorizing (DM) terminal; and/or
   (4) an Identifying (ID) terminal; and
   the detection circuit determines the power supplying capability of the input terminal according to one or more of the following approaches, to generate the adjustment signal:
   (1) by directly detecting the power supplying capability of the input terminal;
   (2) by data received by the DP terminal and/or the DM terminal; and/or
   (3) by data received by the DM terminal which indicates an identification of an external power source electrically connected to the input terminal.

10. The control circuit of the power management circuit of claim 8, wherein the reference voltage adjustment circuit includes one of the following circuits: a digit-to-analog conversion circuit, a mapping circuit, an amplification circuit or a sample-and-hold circuit.

11. The control circuit of the power management circuit of claim 8, wherein the reference voltage adjustment circuit includes:
   an adder circuit for adding a second feedback signal related to a battery voltage of the battery with an offset or a signal related to the offset, to generate a summation signal; and
   a selection circuit, which is responsive to the adjustment signal to:
   (1) select a first predetermined voltage level or a signal related to the first predetermined voltage level as the reference voltage under a circumstance where the adjustment signal indicates that the power supplying capability of the input terminal is in a first state; and
   (2) select a higher one of the followings as the reference voltage: (a) a second predetermined voltage level or a signal related to the second predetermined voltage level or (b) an output of the adder, under a circumstance where the adjustment signal indicates that the power supplying capability of the input terminal is in a second state, wherein the second state is a power supplying capability that is weaker than the first state.

12. The control circuit of the power management circuit of claim 8, further including:
   a second operation circuit for generating a second operation signal at least according to information related to a battery voltage of the battery and information related to the charging current, to control an operation of the second switch, so that the charging current is controlled.

13. A control method of a power management circuit, comprising the steps of:
   (A) converting an input voltage at an input terminal to an output voltage at an output terminal and charging a battery from the output terminal;
   (B) detecting a power supplying capability of the input terminal;
   (C) generating an adjustment signal according to the power supplying capability of the input terminal; and
   (D) adjusting a target level of the output voltage according to the adjustment signal, wherein the step (A) includes:
(A1) generating a first feedback signal according to the output voltage; and
(A2) comparing the first feedback signal with a reference voltage to regulate the target level of the output voltage to a level corresponding to the reference voltage,
wherein a first switch is electrically connected between the input terminal and the output terminal and a second switch is electrically connected between the output terminal and the battery, and the step (A2) further includes: controlling an operation of the first switch or an operation of the second switch according to a comparison result between the first feedback signal and the reference voltage.

14. The control method of claim 13, wherein the step (D) includes:
adjusting the output voltage according to the adjustment signal by two steps, by multiple steps more than two, or continuously.

15. The control method of claim 13, wherein the step (D) includes:
setting the target level of the output voltage as a first constant under a circumstance where the adjustment signal indicates that the power supplying capability of the input terminal is in a first state, wherein the first constant is relatively closer to a level of the input voltage; and
under a circumstance where the adjustment signal indicates that the power supplying capability of the input terminal is in a second state, wherein the second state is a power supplying capability that is weaker than the first state, setting the target level of the output voltage as one of the followings:
(1) setting the target level of the output voltage as a second constant, wherein the second constant is relatively closer to a level of the battery voltage;
(2) setting the target level of the output voltage to vary dependent on the power supplying capability of the input terminal;
(3) setting the target level of the output voltage to be determined by a sum of an offset plus the battery voltage; or
(4) setting the target level of the output voltage to be determined by a higher one of (a) the sum of the offset plus the battery voltage and (b) a predetermined voltage level.

* * * * *